United States Patent [19]

Onoda et al.

[11] 4,032,485

[45] June 28, 1977

[54] POLYURETHANE FOAMS BASED ON MIXED ITACONIC ACID POLYESTERS

[75] Inventors: Koji Onoda, Tokyo; Atsuyuki Matsumoto, Tokorozawa; Hiroshi Ogawara, Matsudo; Akira Nishimura, Kokubunji, all of Japan

[73] Assignee: Miyoshi Yushi Kabushiki Kaisha, Tokyo, Japan

[22] Filed: Feb. 27, 1975

[21] Appl. No.: 553,726

[52] U.S. Cl. .................... 260/2.5 AN; 260/2.5 AP; 260/2.5 BE
[51] Int. Cl.$^2$ ................. C08G 18/14; C08G 18/42
[58] Field of Search ................. 260/2.5 AN, 2.5 BE, 260/2.5 AP

[56] References Cited

UNITED STATES PATENTS

| | | | |
|---|---|---|---|
| 2,290,378 | 6/1961 | Hurwitz et al. | 260/2.5 |
| 2,924,581 | 2/1960 | Bavley et al. | 260/2.5 AN |
| 3,208,957 | 9/1965 | Powanda | 260/2.5 AP |
| 3,304,273 | 2/1967 | Stamberger | 260/2.5 |
| 3,383,351 | 5/1968 | Stamberger | 260/2.5 BE |
| 3,523,093 | 8/1970 | Stamberger | 260/2.5 |
| 3,600,340 | 8/1971 | Patton et al. | 260/2.5 BE |
| 3,746,663 | 7/1973 | Beale et al. | 260/2.5 BE |
| 3,850,861 | 11/1974 | Fabris et al. | 260/2.5 BE |
| 3,869,413 | 3/1975 | Blankenship | 260/2.5 BE |

FOREIGN PATENTS OR APPLICATIONS

| | | | |
|---|---|---|---|
| 711,309 | 6/1965 | Canada | 260/2.5 BE |
| 44,555 | 11/1969 | Japan | 260/2.5 BE |
| 1,028,908 | 5/1966 | United Kingdom | 260/2.5 BE |
| 1,040,052 | 8/1966 | United Kingdom | 260/2.5 BE |
| 1,137,465 | 12/1968 | United Kingdom | 260/2.5 BE |

OTHER PUBLICATIONS

Japanese Patent Application Publication Nos. Sho. 35-4785, 41-5316, 43-17594, 46-14676, 49-46556.
Japanese Patent Application Laying Open Nos. Sho. 47-5699, 48-39595.

*Primary Examiner*—H.S. Cockeram
*Attorney, Agent, or Firm*—Cushman, Darby & Cushman

[57] ABSTRACT

A process for preparing polyurethane foams excellent in durability, elasticity and dimensional stability is disclosed. An unsaturated polyester is prepared through the reaction of an unsaturated dicarboxylic acid with a polyhydroxy compound having at least three reactive hydrogen atoms. The polyester is homopolymerized or copolymerized with other vinyl monomers to produce a homopolymer or a homocopolymer. The polymer or the copolymer is used either alone or together with the polyol as a polymer-polyol for the preparation of polyurethane foams.

28 Claims, No Drawings

POLYURETHANE FOAMS BASED ON MIXED ITACONIC ACID POLYESTERS

BACKGROUND OF THE INVENTION a. Field of the Invention

The present invention relates to a process for preparing elastic polyurethane foams and to products produced by such a process. More particularly, the invention is concerned with a process for preparing elastic polyurethane foams which involves the use of a novel polyol composition as a raw material and it is also concerned with products produced by such a process.

b. Description of the Prior Art.

It is well known to the art to produce polyurethane foams through the interaction of polyisocyanates with organic compounds having reactive hydrogen atoms in their structures. In such production, so-called "polyols" such as polyether-polyols and polyester-polyols are generally employed as said polyhydroxy compounds having a reactive hydrogen.

Polyoxypropylene glyceryl ether, polyoxypropylene diglyceryl ether, polyester of alkylene glycol and the like have hitherto been used as a polyol in the preparation of elastic polyurethane foams. However, the elastic polyurethane products produced from such polyols as mentioned above are unsatisfactory in view of their poor physical properties as in hardness, elasticity, and dimensional stability.

Under the foregoing circumstances, there has been proposed methods for preparing polyurethanes which use polyols generally referred to as "polymer-polyols" and containing a polymer of relatively high molecular weight in an attempt to eliminate the cause of the aforesaid unsatisfactory result. Such methods are disclosed, for example, in Japanese Patent Application Publication No. Sho 41-3743, the priority rights of which are claimed based on U.S. Patent Application Ser. No. 155,467 of Paul Stamberger, now abandoned but of which continuation-in-part applications have issued as U.S. Pat. Nos. 3,304,273 and 3,383,361. According to the methods of Stamberger U.S. application 155,467 (and corresponding Japanese publication No. Sho 41-3743) and Stamberger U.S. Pat. No. 3,304,273, a polymer-polyol produced by polymerizing a monomer in a polyol is employed to prepare polyurethanes. However, it is difficult for these inventions to achieve uniform polyurethane foams, because in the production of the polymer-polyol, no chemical reaction of the polymer with the polyol takes place. As to the chemical bonding status between the polymer and the polyol, Japanese Patent Application Publication No. Sho 41-3473 and U.S. application Ser. No. 155,467 only assumes the bonding formed by the graft-polymerization.

It has also been proposed to prepare a polyester-polyol by the interaction of an unsaturated dicarboxylic acid such as itaconic acid used as a part of the acid components with a polyhydroxy compound. For example, U.S. Pat. No. 2,924,581 to A. Bavley et al describes a method of preparing a polyester-polyol for use in the production of polyurethanes. According to the patent to Bavley et al, the polyester-polyol is prepared by reacting a mixture of itaconic acid and adipic acid with ethylene glycol. Since the polyester-polyol obtained by the method has a reactive double bond, it is expected that, when the polyester-polyol is used for the production of polyurethane foams, properties of the product are improved due to the simultaneous occurrence of a urethanating reaction and a radical polymerization reaction at the time of the reaction of the polyester polyol with a polyisocyanate. The radical polymerization is either the homopolymerization of the polyester-polyol per se or the copolymerization of the polyester-polyol with an added monomer having vinyl type double bonds in the presence of a polymerization catalyst. Contrary to the expectation, however in reality, the urethane foam products heretofore produced by the use of polyester-polyol have many undesirable cracks and are far from industrial use. In fact, Bavley et al add a polymerization inhibitor such as naphthoquinone after the esterification to inhibit the polymerization of the polyester-polyol and then carry out the reaction with a polyisocyanate.

Another type of polyol composition is proposed in Japanese Patent Application Publication No. Sho 49-15959 in which a polyol for use in producing polyurethane foams with improved properties is prepared by reacting an unsaturated dicarboxylic acid with an alkylene oxide. According to the method of this published application, a urethanating reaction and a radical polymerization of the polyol simultaneously take place, but an additional step is required to distill out the remaining alkylene glycol. Accordingly, the method is not free from disadvantages in its realization on an industrial scale. Furthermore, it is presumed in the method that the double bonds effective to contribute to the enhancement of properties of the polyurethane foam products are reduced in ratio. In other words, the method of the published Japanese patent application does not provide a fundamental solution of the foregoing problems encountered in the production of polyurethane foam products.

Since the known methods as described above employ a diol such as alkylene glycol or a triol of relatively low molecular weight as a polyhydroxy compound, the remaining polyol adversely affects the physical properties of the resulting products such as elasticity and hardness. Accordingly, the methods must include an additional step to remove the remaining polyol.

It is known that polyurethane foams having better properties are produced from a polyol of relatively high molecular weight than a polyol of relatively low molecular weight and that triols are much more desirable than diols for the polyol of relatively high molecular weight.

SUMMARY OF THE INVENTION

It is a primary object of the present invention to provide a process for preparing polyurethane foams having improved hardness, tensile strength, durability, elasticity, dimensional stability, compression set characteristics, foam uniformity and the like.

Another object of the present invention is to provide a process for preparing polyurethane foams in which particles of a polymer are so fine and dissolved homogeneously in a solvent such as a polyol medium as to improve the foam uniformity and compression set characteristics of the polyurethane foam products.

Still another object of the present invention is to provide a process for preparing polyurethane foams in which the length between cross-linking points is controllable whereby the control over physical properties of the polyurethane foam products is easily made as desired.

A further object of the present invention is to provide a process for preparing polyurethane foams in which the most suitable polymer-polyol is easily prepared as a raw material for the desired properties of the polyurethane foam products.

Still a further object of the present invention is to provide a process for preparing polyurethane foams in which the remaining polyol never adversely affects physical properties of the polyurethane foam products.

According to the present invention, there is provided a process for preparing polyurethane foams which comprises using, as one of the raw materials, a polymer-polyol containing a polymer resulting from the polymerization of a polyester prepared by reacting an acid component containing itaconic acid alone or containing itaconic acid and also containing at least one other dibasic acid selected from the group consisting of succinic acid, adipic acid, sebacic acid and phthalic acid with a polyol having a mean molecular weight of at least 2000 and also having the general formula $R[(OR')_nOH]_m$ in which R represents a polyol residue having at least three reactive hydrogen atoms, R' represents ethylene or propylene, n is an integer from 30 to 100 and m is an integer from 3 to 6, in the ratio of one mole of the average molecular weight of said acid component to one to six moles of said polyol.

These and other objects and advantages of the present invention will become more apparent upon reference to the following detailed description and appended claims.

DETAILED DESCRIPTION OF PREFERRED EMBODIMENTS

The present inventors have made an extensive study and found that the polymer-polyol composition most suitable for a starting material for the production of polyurethane foams is either a homopolymer of a polyester of an unsaturated acid produced through reacting itaconic acid or a mixture of itaconic acid and other dibasic acids with a polyol having at least three reactive hydrogen atoms, or a copolymer of such a polyester and vinyl monomers. The present invention is based on the finding and provides a process for preparing polyurethane foams which comprises using, as one of the raw materials, a polymer-polyol including a polymer resulting from the polymerization of a polyester prepared by reacting an acid component containing itaconic acid alone or containing itaconic acid and also containing at least one other dibasic acid selected from the group consisting of succinic acid, adipic acid, sebacic acid, and phthalic acid with a polyol having a molecular weight of at least 2000 and also having the general formula $R[(OR')_nOH]_m$ in which R represents a polyol residue having at least three reactive hydrogen atoms, R' represents ethylene or propylene, n is an integer from 30 to 100 and m is an integer from 3 to 6, in the ratio of one mole of the average molecular weight of said acid component to one to six mole of said polyol.

More specifically, the present invention is preferably characterized by the use of a novel polymer-polyol composition prepared by the polymerization reaction of a polyester obtained by the esterification of one mole of itaconic acid having reactive vinyl type double bonds or its mixture with other dibasic acids in an amount of up to 88/140ths of at least one other dibasic acid with one to six moles of a polyol having at least three hydroxyl radicals and also having a molecular weight of at least 2,000. The esterification is carried out at a temperature of 90° to 160° C until the acid value of the reactant becomes five or less. The polymerization may be carried out with the ester resulting from the esterification alone or together with other monomers. The resulting polymer can be employed alone as the polymer-polyol or in the state of a mixture with other polyols.

According to the present invention, the dibasic acids for use with the itaconic acid include succinic acid, adipic acid, sebacic acid and phthalic acid. One or more of these dibacic acids can be employed with the itaconic acid.

The polyol to be reacted with the itaconic acid or a mixture of the itaconic acid and the above-mentioned dibasic acids is expressed by the general formula $R[(OR')_nOH]_m$ in which R represents a polyol residue having three to six hydroxyl radicals, R' represents ethylene or propylene, n is an integer 30 to 100, and m is an integer 3 to 6.

The compounds which can be used for the polyol include (A) compounds prepared by the addition reaction of (1) one mole of a polyhydroxy compound such as glycerine, hexanetriol, trimethylol propane, diglycerine, sorbitan, pentaerythritol, dipentaerythritol, and sucrose esters and (2) at least 30 moles of an oxide such as ethylene oxide, propylene oxide, and a mixture of ethylene oxide and propylene oxide; (B) compounds prepared by the addition reaction of (1) one mole of one of the esters such as fatty acid mono ester of sorbitan, fatty acid mono ester of pentaerythritol, fatty acid mono ester of dipentaerythritol, fatty acid diester of dipentaerythritol, fatty acid triester of dipentaerythritol and fatty acid esters of sucrose and (2) at least 30 moles of an oxide such as ethylene oxide, propylene oxide and a mixture of ethylene oxide and propylene oxide.

The mean molecular weight of the above-mentioned polyols are 2,000 or more and the molecular weight preferably employed in the process of the present invention is 2,000 to 5,000. When a polyol having such mean molecular weight is used, the remaining non-reacted polyol, if any, has no influence upon the properties of the foam products. In case an amount of a polyol of lower molecular weight remains non-reacted, it will have a substantial unfavorable influence upon properties of the foam products such as elasticity, hardness, a dimensional stability, and foam uniformity.

According to the present invention, any vinyl monomer that has vinyl type double bonds and is capable of polymerization with itaconic acid or a mixture of itaconic acid and other unsaturated dibasic acids can be used for the monomer to be copolymerized with the polyester. Such vinyl monomers include dialkyl esters of itaconic acid, mono ester of itaconic acid, styrene, methyl acrylate, ethyl acrylate, methyl methacrylate, hexamethacrylate, acrylonitrile, methacrylonitrile, acryl amides, and vinyl acetate.

The polymer-polyol of the present invention is prepared by adding one to six moles of any of the above-mentioned polyols to one mole of itaconic acid or a mixture of itaconic acid and other dibasic acids and heating the resulting mixture to 90°–160° C, preferably 120°–150° C, while stirring to cause esterification. A catalyst for esterification such as hydrochloric acid, sulfuric acid, p-toluene-sulfonic acid may be added as desired at the time of the esterification. The esterification is ended at the time when the acid value of the ester becomes five or less. The resulting polyester as it is or in the state of a mixture thereof diluted with a polyol is subjected to polymerization at 80°–90° C in the presence of a catalyst for polymerization such as benzoyl peroxide and azobisisobutyronitrile to obtain a polymer-polyol of the present invention.

A vinyl monomer may be added to the mixture of the polyester and a polyol which is to be subjected to the polymerization.

The polymer-polyol thus obtained contains a polymer resulting from the polymerization of an ester of itaconic acid and is used for the polyurethane production either alone or in the state of a mixture thereof diluted with a polyol.

Since the polymer-polyol of a the present invention is of trifunctional or polyfunctional polyol, it has abundant points to be cross-linked and much contributes to the improvement in hardness, strength and the like of the polyurethane foams. At the same time, the polymer-polyol consists of uniform particles and has excellent dispersibility which enhances uniformity and compression set characteristics of the polyurethane foams.

Furthermore, according to the present invention, the distance between cross-linking points is readily controlled by the selection of saturated dibasic acids mixed with itaconic acid whereby the dispersibility of the polymer into the polyol as well as the properties of the foam become controllable. In other words, the present invention makes it possible to properly select dibasic acids, depending upon a variety of properties of the polyurethane foams required for their specific use.

The polymer-polyol according to the present invention can be widely used in the preparation of polyurethane foam products and in particular, it finds the most advantageous application in the production of elastic polyurethanes suitable for cushioning stuff. In such an application, the polymer-polyol will much improve hardness, tensile strength, elasticity, compression set characteristics, foam uniformity and the like of the foam products.

The present invention will be further described with reference to the examples which follow. In the examples, parts are by weight unless otherwise indicated and the physical properties of the polyurethane foams obtained in the examples are collectively listed in the table given later.

EXAMPLE 1

Itaconic acid; 130 parts
Polypropylene oxide glyceryl ether ($\overline{M.W.}$=3,000); 6,000 parts
p-Toluenesulfonic acid; 30.7 parts A mixture of the above-listed materials was reacted at a temperature of 120°–140° C for 7 hours to prepare a polyester having an acid value of 4.5 and a viscosity of 1,750 cp (25° C). 0.1 part of benzoyl peroxide was added to 100 parts of the polyester and the resulting mixture was placed in a reactor filled with nitrogen gas and polymerized at a temperature of 90° C for 3 hours to produce a polymerized compound of a viscosity of 71,000 cp (25° C).

Polypropylene oxide glyceryl ether ($\overline{M.W.}$=3,000); 85 parts
Methylenediphenyldiisocyanate; 43 parts
Triethylenediamine; 1 part
Water; 2 parts The above-listed materials were added to 15 parts of the polymerized compound and the resulting mixture was foamed to obtain a polyurethane foam product.

EXAMPLE 2

Itaconic acid; 78 parts
Sebacic acid; 83.2 parts
Polyethylene oxide propylene oxide glyceryl ether ($\overline{M.W.}$=4,000); 6,000 parts
P-Toluenesulfonic acid; 20.7 parts A mixture of the above-listed materials was reacted at a temperature of 120°–150° C for 6 hours to prepare a polyester having an acid value of 3.8 and a viscosity of 3,500 cp (25° C). 0.13 part of azobisisobutyronitrile was added to 100 parts of the polyester and the resulting mixture was placed in a reactor filled with nitrogen gas and polymerized at a temperature of 85° C for 5 hours to produce a polymerized compound of a viscosity of 60,800 cp (25° C).

Polypropylene oxide glyceryl ether ($\overline{M.W.}$=3,000); 76 parts
Methylenediphenyldiisocyanate; 40.5 parts
Triethylenediamine; 1 part
Water; 2 parts The above-listed materials were added to 20 parts of the polymerized compound and the resulting mixture was foamed to obtain a polyurethane foam product.

EXAMPLE 3

Itaconic acid; 52 parts
Adipic acid; 58.4 parts
Phthalic anhydride; 29.6 parts
Polypropylene oxide diglycerine ($\overline{M.W.}$=4,200); 6,300 parts
p-Toluenesulfonic acid; 32 parts A mixture of the above listed materials was reacted at a temperature of 120°–140° C for 2 hours, and then was reacted at a temperature of 90° for 3.5 hours to prepare a polyester having an acid value of 4.5 and a viscosity of 3,600 cp (25° C). 58 parts of polypropylene oxide glyceryl ether and 0.5 part of azobisisobutyronitrile were added to 42 parts of the polyester and the resulting mixture was placed in a reactor and polymerized at a temperature of 85° C for 4.5 hours to produce a polymerized compound of a viscosity of 7,000 cp (25° C).

Polypropylene oxide glyceryl ether ($\overline{M.W.}$=3,000); 58 parts
Methylenediphenyldiisocyanate; 38 parts
Triethylenediamine; 1.2 parts
Water; 2 parts The above-listed materials were added to 40 parts of the polymerized compounds and the resulting mixture was foamed to obtain a polyurethane foam product.

EXAMPLE 4

Itaconic acid; 104 parts
Succinic anhydride; 20 parts
Polypropylene oxide sorbitol ether ($\overline{M.W.}$=3,500); 5,500 parts
p-Toluenesulfonic acid; 28.1 parts A mixture of the above-listed materials was reacted at a temperature of 120°–140° C for 4.5 hours to prepare a polyester having an acid value of 4.0 and a viscosity of 2,420 cp (25° C). 70 parts of Polypropylene oxide glyceryl ether and 0.1 part of benzoyl peroxide were added to 75 parts of the polyester and the resulting mixture was polymerized at a temperature of 85° C for 5.0 hours to produce a polymerized compound of a viscosity of 7,100 cp (25° C).

Polypropylene oxide glyceryl ether ($\overline{M.W.}$=3,500); 25 parts
Methylenediphenyldiisocyanate; 44 parts
Trimethylenediamine; 1.1 parts
Water; 2 parts The above listed materials were added to 75 parts of the polymerized compound and the resulting mixture was foamed to obtain a polyurethane foam product.

EXAMPLE 5

80 parts of Polypropylene oxide glyceryl ether ($\overline{M.W.}$=4,000) and 0.1 part of benzoyl peroxide were added to the polyester obtained in Example 1, and the resulting mixture was placed in a reactor filled with nitrogen gas and polymerized at a temperature of 90° C for 4 hours to produce a polymerized compound having a viscosity of 8,400 cp (25° C).

Tolylenediisocyanate; 41 parts
Triethylenediamine; 1 part
Water; 2 parts

The above-listed materials were added to the polymerized compound and the resulting mixture was foamed to obtain a polyurethane foam product.

EXAMPLE 6

56 parts of polypropylene oxide diglycerine ($\overline{M.W.}$=4,500) and 0.14 part of benzoyl peroxide were added to 44 parts of the polyester obtained in Example 2, and the resulting mixture was placed in a reactor filled with nitrogen gas and polymerized at a temperature of 80° C for 5.5 hours to produce a polymerized compound having a viscosity of 6,200 cp.

Tolylenediisocyanate; 43 parts
Triethylenediamine; 1 part
Water; 2 parts

The above-listed materials were added to 100 parts of the polymerized compound and the resulting mixture was foamed to obtain a polyurethane foam product.

EXAMPLE 7

10.5 parts of styrene, 84.5 parts of polypropylene oxide glyceryl ether ($\overline{M.W.}$=3,000) and 0.16 part of azobisisobutyronitrile were added to 5 parts of the polyester obtained in Example 1, and the resulting mixture was placed in a reactor filled with nitrogen gas and polymerized at a temperature of 85° for 5 hours. After the completion of the polymerization reaction, the remaining styrene was distilled out in a reduced pressure and a polymerized compound having a viscosity of 4,600 cp (25° C) was obtained.

Tolylenediisocyanate; 43 parts
Triethylenediamine; 1 part
Water; 2 parts

The above-listed materials were added to the polymerized compound and the resulting mixture was foamed to obtain a polyurethane foam product.

EXAMPLE 8

15.0 parts of styrene, 77.0 parts of polypropylene oxide diglyceryl either ($\overline{M.W.}$=4,500) and 0.15 part of benzoyl peroxide were added to 8.0 parts of the polyester obtained in Example 2, and the resulting mixture was placed in a reactor filled with nitrogen gas and polymerized at a temperature of 80° C for 6 hours to produce a polymerized compound having a viscosity of 5,500 cp (25° C).

Polyoxypropylene oxide glyceryl ether ($\overline{M.W.}$=3,000); 50 parts
Tolylenediisocyanate; 7 parts
Triethylenediamine; 1 part
Water; 2 parts The above-listed materials were added to 50 parts of the polymerized compound and the resulting mixture was foamed to obtain a polyurethane foam product.

EXAMPLE 9

12 parts of methyl methacrylate, 78 parts of polypropylene oxide glyceryl ether and 0.15 part of azobisisobutyronitrile were added to 10 parts of the polyester obtained in Example 3, and the resulting mixture was placed in a reactor filled with nitrogen gas and polymerized at a temperature of 85° C for 6.5 hours. After the completion of the polymerization reaction, the remaining methyl methacrylate was distilled out in a reduced pressure and a polymerized compound having a viscosity of 6,000 cp (25° C) was obtained.

Polypropylene oxide glyceryl ether ($\overline{M.W.}$=3,000); 60 parts
Tolylenediisocyanate; 42 parts
Triethylenediamine; 1 part
Water; 2 parts The above-listed materials were added to 40 parts of the polymerized compound and the resulting mixture was foamed to obtain a polyurethane foam product.

EXAMPLE 10

12 parts of acrylonitrile, 80 parts of polypropylene oxide glyceryl ether ($\overline{M.W.}$=3,500) and 0.12 part of benzoyl peroxide were added to 8 parts of polyester obtained in Example 4, and the resulting mixture was placed in a reactor filled with nitrogen gas and polymerized at a temperature of 80° C for 6 hours. After completion of the polymerization, the remaining acrylonitrile was distilled out in a reduced pressure and a polymerized compound having a viscosity of 5,000 cp (25° C) was obtained.

Polypropylene oxide glyceryl ether ($\overline{M.W.}$=3,000); 55 parts
Tolylenediisocyanate; 41 parts
Triethylenediamine; 1 part
Water; 2 parts The above-listed materials were added to 45 parts of the polymerized compound and the resulting mixture was foamed to obtain a polyurethane foam product.

The physical properties of the polyurethane foams obtained in Examples 1–10 were examined in terms of deflexion, tensile strength, elasticity, permanent compression set characteristics, compression set characteristics, and uniformity by applying load of 25% and 65% to the foams in accordance with the SPI (Society of the Plastics Industry Inc.) examination method. The result of the examinations is shown in the table given under in which the foams are respectively indicated by the number of Examples. Known polyurethane foam products A and B are also presented in the table for the purpose of comparison. In the preparation of the known products A and B, either polypropylene oxide glyceryl ether ($\overline{M.W.}$=4,000) or polypropylene oxide glyceryl ether ($\overline{M.W.}$=3,500) was employed along as a polyol and used in the known preparation method. It is generally known that a polyurethane foam product prepared from a polyol of a larger molecular weight is better in properties compared with that prepared from a polyol of a lower molecular weight.

| | Known products | | Examples | | | | | | | | | |
|---|---|---|---|---|---|---|---|---|---|---|---|---|
| | A | B | 1 | 2 | 3 | 4 | 5 | 6 | 7 | 8 | 9 | 10 |
| Compression Deflexion 25% (Kg/314 cm³) 65% | 6.5 11.5 | 6.0 12.8 | 10.0 17.2 | 9.0 17.2 | 12.5 23.0 | 14.0 25.0 | 11.5 22.5 | 14.0 24.5 | 12.0 22.0 | 13.5 23.0 | 12.0 21.0 | 13.5 24.5 |
| Tensile strength (Kg/cm) | 0.20 | 0.22 | 0.27 | 0.28 | 0.26 | 0.28 | 0.27 | 0.28 | 0.26 | 0.28 | 0.27 | 0.27 |
| Permanent compression set characteristics (70 C, 50%, 22 hrs.) (%) | 4.5 | 4.7 | | 3.0 | 3.5 | 2.7 | | 2.6 | | 3.0 | 3.5 | 3.0 |
| Compression set (%) | 6.5 | 6.5 | | 5.0 | 5.0 | 5.0 | | 5.2 | | 5.5 | 5.0 | 5.0 |
| Rebound (%) | 42 | 43 | 49 | | | | | | 50 | | | |
| Properties of foam | * I.C. | I.C. | | ** | S.U.C. | S.U.C. | S.U.C. | | S.U.C. | | S.U.C. | S.U.C. | S.U.C. |

\* Irregular Cells
\*\* Small uniform Cells

It will be understood from the table that the polyurethane foam products of Examples 1–10 have excellent properties for elastic materials compared to prior art products A and B.

What is claimed is:

1. In a process for preparing a durable elastic polyurethane foam by reacting a polyol with an organic polyisocyanate and a blowing agent, the improvement comprising including an effective amount of a polymer-polyol consisting of a polymer resulting from the radical polymerization through a reactive double bond of a polyester prepared by reacting an acid component containing itaconic acid alone or itaconic acid together with up to 88/140 of at least one other dibasic acid selected from the group consisting of succinic acid, adipic acid, sebacic acid and phthalic acid based on the total weight of the itaconic acid and said other dibasic acid with a polyol having a molecular weight of at least 2,000 and also having the general formula $R[(OR')_nOH]_m$ in which R represents a polyol residue having at least three reactive hydrogen atoms, R' represents ethylene or propylene, n is an integer from 30 to 100 and m is an integer from 3 to 6, in the raio of one mole of the average molecular weight of said acid component to one to six moles of said polyol.

2. A process as defined by claim 1 in which said polyol employed to form said polyester; is a compound selected from one of the following compound classes: (A) a class consisting of compounds prepared by the addition reaction of (1) one mole of a polyhydroxy compound selected from the group consisting of glycerine, hexanetriol, trimethylol propane, diglycerine, sorbitan, pentaerythritol, and dipentaerythritol, and (2) at least five moles of an oxide selected from the group consisting of ethylene oxide, propylene oxide, and a mixture of ethylene oxide and propylene oxide; (B) a class consisting of compounds prepared by the addition reaction of (1) one mole of an ester selected from the group consisting of fatty acid monoester of sorbitan, fatty acid monoester of pentaerythritol, fatty acid monoester of dipentaerythritol, fatty acid diester of dipentaerythritol, fatty acid triester of dipentaerythritol, and fatty acid esters of sucrose, and (2) at least 30 moles of an oxide selected from the group consisting of ethylene oxide, propylene oxide, and a mixture of ethylene oxide and propylene oxide.

3. A process as defined by claim 2 in which (1) polymerization is carried out by adding benzoyl peroxide to a polyester prepared from itaconic acid and polypropylene oxide glyceryl ether, (2) polypropylene oxide glyceryl ether, methylenediphenyldiisocyanate, triethylenediamine and water are added to the polymerized material resulting from (1), and (3) the resulting mixture is foamed to produce a polyurethane foam.

4. A process as defined by claim 2 in which (1) a polymerization is carried out by adding polypropylene oxide glyceryl ether and benzoyl peroxide to a polyester prepared from itaconic acid and polypropylene oxide glyceryl ether, (2) tolylenediisocyanate, triethylenediamine and water are added to the polymerized material resulting from (1), and (3) the resulting mixture is foamed to produce a polyurethane foam.

5. A process as defined by claim 2 in which (1) a polymerization is carried out by adding azobisisobutyronitrile to a polyester prepared from a mixture of itaconic acid and sebacic acid and also from polyethylene-oxide-propylene-oxide glyceryl ether, (2) polypropylene oxide glyceryl ether, methylenediphenylisocyanate, triethylenediamine and water are added to the polymerized material resulting from (1), and (3) the resulting mixture is foamed to produce a polyurethane foam.

6. A process as defined by claim 2 in which (1) a polymerization is carried out by adding polypropylene oxide diglycerine ether and benzoyl peroxide to a polyester prepared from a mixture of itaconic acid and sebacic acid and also from polyethylene oxide propylene oxide glyceryl ether, (2) tolylenediisocyanate, triethylenediamine and water are added to the polymerized material resulting from (1), and (3) the resulting mixture is foamed to produce a polyurethane foam.

7. A process as defined by claim 2 in which (1) a polymerization is carried out by adding polypropylene oxide glyceryl ether and azobisisobutyronitrile to a polyester prepared from a mixture of itaconic acid, adipic acid and phthalic anhydride and also from polypropylene oxide diglycerine ether, (2) polypropylene oxide glyceryl ether, methylenediphenyldiisocyanate, trithylenediamine and water are added to the polymerized material resulting from (1), and (3) the resulting mixture is foamed to produce a polyurethane foam.

8. A process as defined by claim 2 in which (1) a polymerization is carried out by adding polypropylene oxide glyceryl ether and benzoyl peroxide to a polyester prepared from a mixture of itaconic acid and succinic anhydride, and also from polypropylene oxide sorbitol ether, (2) polypropylene oxide glyceryl ether, methylenediphenyldiisocyanate, triethylenediamine and water are added to the polymerized material resulting from (1), and (3) the resulting mixture is foamed to produce a polyurethane foam.

9. A polyurethane foam produced by the process defined by claim 2.

10. A polyurethane foam produced by the process defined by claim 3.

11. A polyurethane foam produced by the process defined by claim 4.

12. A polyurethane foam produced by the process defined by claim 5.

13. A polyurethane foam produced by the process defined by claim 6.

14. A polyurethane foam produced by the process defined by claim 7.

15. A polyurethane foam produced by the process defined by claim 8.

16. In a process for preparing a durable, elastic polyurethane foam by reacting a polyol with an organic polyisocyanate and blowing agent, the improvement comprising including an effective amount of a polymer polyol prepared by (1) the step of preparing a polyester prepared by reacting an acid component containing itaconic acid alone or itaconic acid together with up to 88/140 of at least one other dibasic acid selected from the group consisting of succinic acid, adipic acid, sebacic acid and phthalic acid based on the total weight of the itaconic acid and said other dibasic acid with a polyol having a molecular weight of at least 2,000 and also having the general formula $R[(OR')_nOH]_m$ in which R represents a polyol residue having at least three reactive hydrogen atoms, R' represents ethylene or propylene, n is an integer from 30 to 100 and m is an integer from 3 to 6, in the ratio of one mole of the average molecular weight of said acid component to one to six moles of said polyol and (2) the step of copolymerization of said polyester and at least one vinyl monomer selected from the group consisting of styrene, methyl methacrylate and acrylonitrile and (3) a step of urethanation of the resulting copolymer and the organic polyisocyanate.

17. A process as defined by claim 16 which said polyol to form said polyester is a compound selected from one of the following compound classes: (A) a class consisting of compounds prepared by the addition reaction of (1) one mole of a polyhydroxy compound selected from the group consisting of glycerine, hexanetriol, trimethylol propane, diglycerine, sorbitan, pentaerythritol, and dipentaerythritol, and (2) at least five moles of an oxide selected from the group consisting of ethylene oxide, propylene oxide, and a mixture of ethylene oxide and propylene oxide; (B) a class consisting of compounds prepared by the addition reaction of (1) one mole of a ester selected from the group consisting of fatty acid monoester of sorbitane, fatty acid monoester of pentaerythritol, fatty acid monoester of dipentaerythritol, fatty acid diester of dipentaerythritol, fatty acid triester of dipentaerythritol, and fatty acid esters of sucrose, and (2) at least 30 moles of an oxide selected from the group consisting of ethylene oxide, propylene oxide, and a mixture of ethylene oxide and propylene oxide.

18. A process as defined by claim 17 in which said vinyl type monomer used is at least one monomer selected from the group consisting of dialkylesters of itaconic acid, monoalkylesters of itaconic acid, styrene, methylmethacrylate, ethymethacrylate, hexamethacrylate, methylacrylate, ethylacrylate, acrylonitrile, methacrylonitrile, acrylamide, and vinyl acetate.

19. A process as defined by claim 18 in which (1) a polymerization is carried out in the presence of a polymerization catalyst by adding a polyol and at least one vinyl monomer to a polyester prepared from itaconic acid and polypropylene oxide glyceryl ether, (2) polyisocyanate, urethanating reaction catalyst and water are added to the polymerized material resulting from (1), and (3) the resulting mixture is foamed to produce a polyurethane foam.

20. A process as defined by claim 19 in which (1) a polymerization is carried out by adding styrene, polypropylene oxide glyceryl ether and azobisisobutyronitrile to a polyester prepared from itaconic acid and polypropylene oxide glyceryl ether, (2) tolylenediisocyanate, triethylenediamine and water are added to the polymerized material resulting from (1), and (3) the resulting mixture is foamed to produce a polyurethane foam.

21. A process as defined by claim 19 in which (1) a polymerization is carried out by adding polypropylene oxide diglycerine ether, styrene and benzoyl peroxide to a polyester prepared from a mixture of itaconic acid and sebacic acid and also from polyethylene oxide propylene oxide glyceryl ether, (2) polyoxypropylene oxide glyceryl ether, methylene-diphenyldiisocyanate, tolylenediisocyanate, triethylenediamine and water are added to the polymerized material resulting from (1), and (3) the resulting mixture is foamed to produce a polyurethane foam.

22. A process as defined by claim 19 in which (1) a polymerization is carried out by adding methyl methacrylate, polypropylene oxide glyceryl ether and azobisisobutyronitrile to a polyester prepared from a mixture of itaconic acid, adipic acid and phthalic anhydride and also from polypropylene oxide diglycerine ether, (2) polypropylene oxide glyceryl ether, tolylenediisocyanate, triethylenediamine and water are added to the polymerized material resulting from (1), and (3) the resulting mixture is foamed to produce a polyurethane foam.

23. A process as defined by claim 19 in which (1) a polymerization is carried out by adding acrylonitrile, polypropylene oxide glyceryl ether and benzoyl peroxide to a polyester prepared from a mixture of itaconic acid and succinic anhydride, and also from polypropylene oxide sorbitol ether, (2) polypropylene oxide glyceryl ether, tolylenediisocyanate, triethylenediamine and water are added to the polymerized material resulting from (1), and (3) the resulting mixture is foamed to produce a polyurethane foam.

24. A polyurethane foam produced by the process defined by claim 19.

25. A polyurethane foam produced by the process defined in claim 20.

26. A polyurethane foam produced by the process defined by claim 21.

27. A polyurethane foam produced by the process defined by claim 22.

28. A polyurethane foam produced by the process defined by claim 23.

* * * * *